United States Patent
Wu

(12) 
(10) Patent No.: US 6,192,111 B1
(45) Date of Patent: Feb. 20, 2001

(54) ABSTRACTING SYSTEM FOR MULTI-MEDIA MESSAGES

(75) Inventor: Charles C. Wu, Broomfield, CO (US)

(73) Assignee: Avaya Inc., Basking Ridge, NJ (US)

(*) Notice: Under 35 U.S.C. 154(b), the term of this patent shall be extended for 0 days.

(21) Appl. No.: 09/019,616

(22) Filed: Feb. 6, 1998

(51) Int. Cl.$^7$ ............................................... H04M 1/64
(52) U.S. Cl. ............................. 379/88.13; 379/88.11
(58) Field of Search ........................ 379/67.1, 880.06, 379/88.11, 88.12, 88.13, 88.14, 88.19, 88.2, 88.21, 88.22, 88.15, 106.09, 201

(56) References Cited

U.S. PATENT DOCUMENTS

| | | | | |
|---|---|---|---|---|
| 5,381,466 | * | 1/1995 | Shibayama et al. | 379/88 |
| 5,475,738 | * | 12/1995 | Penzias | 379/67 |
| 5,479,411 | * | 12/1995 | Klein | 370/110.1 |
| 5,524,137 | | 6/1996 | Rhee | 379/67 |
| 5,717,742 | * | 2/1998 | Hyde-Thomson | 379/88 |
| 5,781,614 | * | 7/1998 | Brunson | 379/88 |
| 5,822,404 | * | 10/1998 | Cave | 379/67 |
| 5,870,454 | * | 2/1999 | Dahlen | 379/88.14 |
| 5,987,100 | * | 11/1999 | Fortman et al. | 379/88.14 |
| 5,999,594 | * | 12/1999 | Mizoguchi et al. | 379/88.14 |
| 6,072,862 | * | 6/2000 | Srinivasan | 379/88.13 X |
| 6,075,843 | * | 6/2000 | Cave | 379/88.13 |

\* cited by examiner

*Primary Examiner*—Scott L. Weaver
(74) *Attorney, Agent, or Firm*—Duft, Graziano & Forest, P.C.

(57) ABSTRACT

The present multi-media message storage system functions to provide the user with a playback that represents a capsulization of the content of the stored message to thereby enable the user to determine whether the stored message contains sufficient information that warrants the user playing back the entirety of the message. The summary consists of content descriptive information that is excerpted from the body of the message and played back to the user in a form that differs from that used to store the received message. This feature enables a multi-media message storage system to store and retrieve text messages for a user in an efficient manner, thereby enabling the multi-media message storage system to function as a multi-media mail system.

24 Claims, 2 Drawing Sheets

ABSTRACTING SYSTEM FOR MULTI-MEDIA MESSAGES

FIELD OF THE INVENTION

This invention relates to communication systems that provide a user with access to stored messages and, in particular, to a multi-media message storage system that enables a user to retrieve a message that is stored in a native mode, as well as a summary of the stored message, in a mode that differs from the native mode of the received message, such as receiving an audible summary of a text message.

PROBLEM

It is a problem in the field of communication systems to provide a user with efficient access to the information that is transmitted to them by other users. This is a particular problem in the field of message storage systems wherein there presently is no apparatus that enables a user to conveniently retrieve a message in a selected communication mode when this message has been stored in another, native communication mode that is different than the selected communication mode. In particular, voice messaging systems, such as voice mail, enable a calling party to store a voice message in a memory for later retrieval by the called party. The message transmission storage and retrieval functions in such a system are all performed in the form of voice mode of communication. Similarly, in a text storage system, such as e-mail, the message transmission storage and retrieval are in a uniform communication mode which comprises text communication. In such an environment, it is difficult for a user to retrieve text messages in voice form or voice messages in text form.

There are some communication mode conversion systems that enable a user to retrieve a stored text message in audible form wherein such system converts the text message into a computer generated spoken output. The difficulty with such a system is that the content of communications among humans varies as a function of the communication mode. In particular, a calling party typically transmits a message in voice form that is of shorter length than a text message that would be transmitted from that calling party. Therefore, a system that converts a stored text message to voice response form results in the playback of an extremely long message compared to messages that were originated, stored and played back in voice form. In order to reduce the duration of the playback interval, these systems sometimes play back the header that is prepended to the stored text message or play only a truncated version of the message. The difficulty with such a method of playback is that the calling party may not provide a header or may provide a header that is cryptic in nature and does not benefit the user in ascertaining the content of the message. Furthermore, the playback of a truncated version of the message simply provides a small segment of information and the significant content of the message may not reside in the truncated portion that is presented to the user. In this instance, the playing of the truncated portion of the message does not benefit the user.

There does exist a multi-media messaging system disclosed in U.S. Pat. No 5,524,137 that enables a user to select the communication format for communications between the system and the user. This enables the user to direct the system to convert the communication format of a stored message for the user from a first format (video) to a second format (audio). Another feature of this system enables the user to change the language of the outputted message to be different from the language of the stored message.

Therefore, in existing message storage systems, there is no effective mode of communicating the content of a stored message to a user in audible form. Existing message storage systems either play back the entirety of the message or resort to an ineffective manner of communicating the message content. Thus, the conversion of text and video messages to voice form is an inefficient mode of message retrieval since playing back the entirety of the message typically occupies a significantly increased amount of message retrieval time for the user.

SOLUTION

The above described problems are solved and a technical advance achieved by the present multi-media message storage system that functions to provide the user with a playback that represents an accurate capsulization of the content of the stored message to thereby enable the user to determine whether the stored message contains sufficient information that warrants the user playing back the entirety of the message. The summary consists of content descriptive information that is excerpted from the body of the message and played back to the user in a form that differs from that used to store the received message. This feature enables a voice mail system to store and retrieve text messages for a user in an efficient manner, thereby enabling the voice mail system to function as a multi-media message storage system.

This processing of text messages by the multi-media message storage system is accomplished by transmitting the text message, when received in the multi-media message storage system, to a message abstract apparatus that functions to process the received text message in a manner to extract information from the body of the received text message that accurately describes the content of the text message. The abstracting system can perform its function in numerous ways with varying degrees of complexity of processing and various degrees of relevance of its output. For example, a simple processing method of abstracting the received text message can be the extraction of the first sentence of each paragraph for storage in an associated file comprising the abstract portion of the message. A far more sophisticated type of processing comprises parsing the entirety of the received text message to identify word frequency and word pattern content therein to create a set of key words representative of the message content and/or strings that are indicative of the message content. As with the last described system, this abstracting information is stored in a separate file and is associated with the received text message.

Further message characterizing data can be produced by the message abstract apparatus, such as the length of the text message in terms of number of words and the predicted length of time required for playback. Therefore, when the user accesses the multi-media message storage system, the user is provided the opportunity to retrieve the abstract portion of the stored information to thereby determine the relevancy of the entirety of the text message. By the provision of this abstract information, the user can more efficiently scan through a series of messages to identify those that are of particular relevance and that warrant immediate attention. In addition, the provision of additional message characterizing data enables the user to determine how much time is required to deal with a particular stored message.

DETAILED DESCRIPTION

Figure 1:
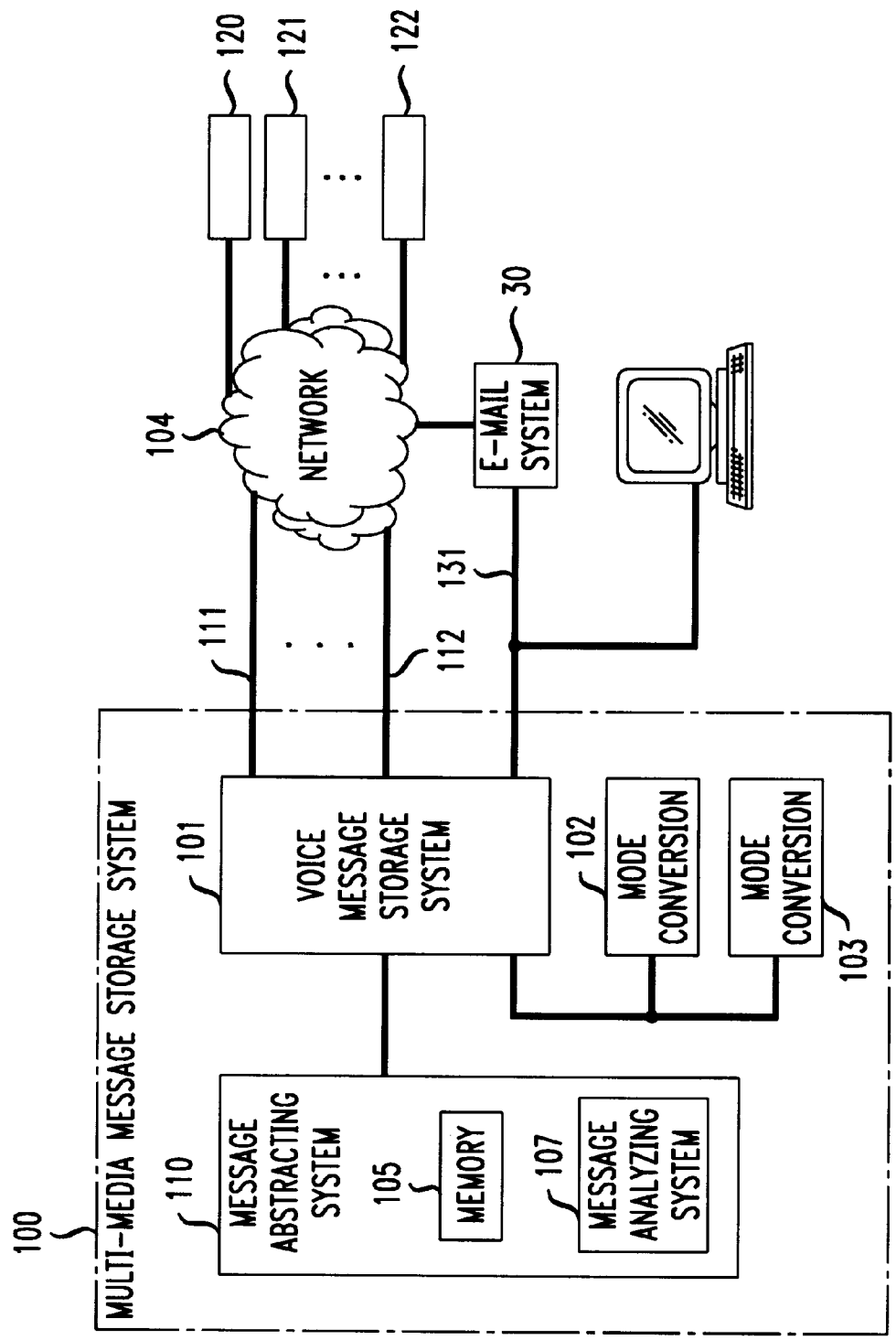
FIG. 1 illustrates in block diagram form the multi-media message storage system of the present invention as well as its typical operating environment.

FIG. 1 illustrates in block diagram form the present multi-media message storage system 100 for providing output of summaries of stored messages. The present multi-media message storage system 100 functions to automatically produce a content accurate short abstract in response to receipt of a message, which abstract is computed from the entirety of the body of the message and is indicative of the content of the received message. In addition, the multi-media message storage system 100 can optionally provide additional message characterizing data to assist the user in determining whether to retrieve the stored message in its entirety.

The implementation of the present multi-media message storage system 100 can either be incorporated into a text message storage and retrieval system that provides the user with the option to retrieve text messages in audio form or the multi-media message storage system 100 can reside in a multi-media message storage system that accepts text messages as part of the message storage and retrieval capability. In the preferred embodiment of the invention disclosed in FIG. 1, the present multi-media message storage system 100 is embodied as a voice message storage system that can receive messages from calling parties either in the form of a voice message or in the form of a text message. In each case, the received message is stored in its native format, that is the voice message is stored as an audio file and the text message is stored as a text file.

Architecture of the Multi-Media Message Storage System

The preferred embodiment of the present multi-media message storage system 100 comprises message abstracting apparatus 110 and mode conversion circuits 102, 103 that are integrated into a conventional voice message storage system 101. The multi-media message storage system 100 is equipped with a plurality of communication links 111, 112 that function to interconnect the multi-media message storage system 100 with a communication medium 104 that enables users 120–122, who are also connected to the communication medium 104, to transmit messages to the multi-media message storage system 100 for storage therein. The voice message storage system 101 is a well-known element that stores received voice messages for a plurality of subscribers and retrieves these stored voice messages for later retrieval by these subscribers.

A fundamental limitation in the operation of voice message storage system 101 is that the users can input messages in a native mode but the subscribers who retrieve messages must utilize the same mode to retrieve these stored messages. Thus, a subscriber cannot access stored text messages unless they are equipped with a text terminal, such as a personal computer. The same problem exists for the storage and retrieval of video messages. The following description uses the example of the storage of text messages in the voice message storage system 101 and the later retrieval of these stored text message by a subscriber, using a voice mode of message retrieval. The capability to access stored text messages via a non-text terminal is rendered more efficient by the present multi-media message storage system 100 since this system crates a content accurate summary of a stored text message and presents this summary to the subscriber in a mode that differs from that used to store the message.

In particular, multi-media message storage system 100 comprises a message abstracting system 110 that generates a summary of a received text message based upon the body of the text message. The message abstracting system 110 can also optionally provide additional message characterizing data that relates to the received text message, such as the time required to present the received text message in audible form, an excerpted header portion of the received text message, and the like. The message abstracting system 110 can include a memory 105 that is used to store data indicative of the identity of the received text message, the excerpted summary, as well as the ancillary data also generated by the message abstracting system 110. Alternatively, this data can be stored with the text message in the multi-media message storage system 100.

Method of Operation of the Multi-Media Message Storage System

Figure 2:
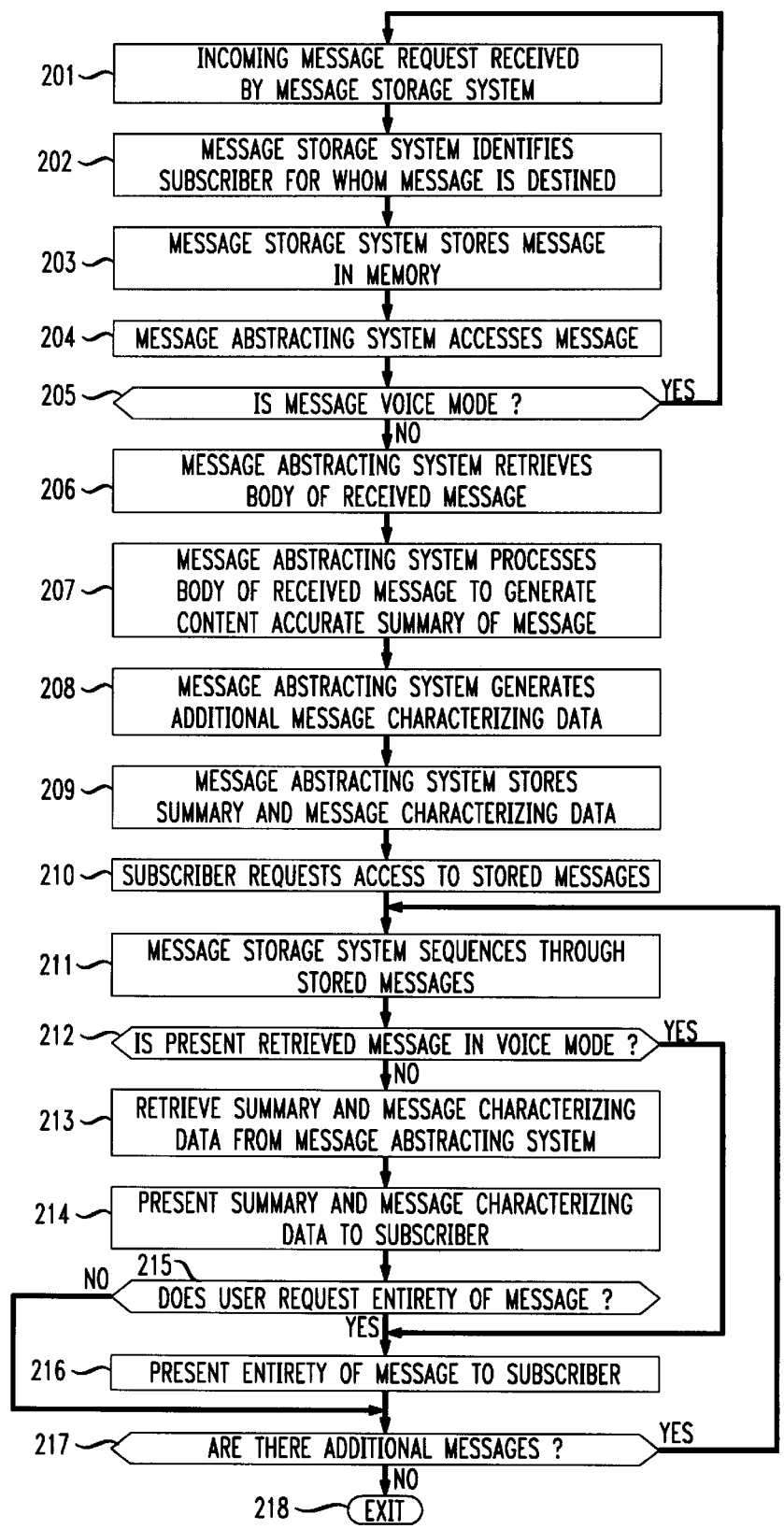
FIG. 2 illustrates in flow diagram form the operational steps taken by the present multi-media message storage system to store text messages, generate an abstract thereof and present the abstract and text message to a user.

The operation of the multi-media message storage system 100 is illustrated by an example of a typical call processing scenario described in flow diagram form in FIG. 2, wherein a calling party initiates a message transaction to store a message destined for a subscriber who has a user log-in on the multi-media message storage system 100 shown in FIG. 1. The multi-media message storage system 100 comprises well-known apparatus that is responsive to receipt of a communication connection from a calling party at step 201 for the storage of a message received in voice form from the calling party in an associated memory. As part of the voice storage process, the calling party at step 202 identifies the user to whom this message is destined and can also provide various delivery options such as immediately delivery, delayed delivery, normal delivery and the like. Such functionality is well-known in the field of multi-media message storage systems and is not described in detail herein. The multi-media message storage system 100, upon receipt of a message, stores the message in memory at step 203 with the appropriate addressing to indicate that this message is destined for the particular user.

In addition to the traditional voice mail functionality, the present multi-media message storage system can also receive and store text messages for transmission to the user. The text messages can be directly input by a calling party or can be forwarded from an E-mail system 130 as is illustrated in the block diagram of FIG. 1. In particular, a calling party generates an E-mail message on, for example, their personal computer, and the E-mail message is forwarded via a communication medium 131, such as Internet, to the user's message mail box which is illustrated in FIG. 1 as the multi-media message storage system 100. In order for the user to retrieve text messages from multi-media message storage system 100, the conventional requirement is that the user must make use of a text-capable terminal, such as a personal computer, and use this device to establish a communication connection with the multi-media message storage system 100. The user can then, in well-known fashion, retrieve text messages that are stored in the multi-media message storage system 100 as well as input text messages for transmission to other parties.

Once a message is stored in the multi-media message storage system 100, the message abstracting apparatus 110 is activated to access the received message at step 204 and determine the mode of the received message at step 205. If the received message is in voice mode, no further processing is required and the message abstracting apparatus 110 does not need to be activated and processing exits at step 218. However, if the received message is not a voice mode message, the abstracting apparatus 110 is activated to produce data that accurately characterizes the nature and content of the received message to thereby enable the subscriber to determine whether this message warrants playback in its entirety. Therefore, at step 206, the message abstracting apparatus 110 retrieves the body of the received message and at step 207 generates a content accurate summary of the received message. The content accurate summary comprises data that provides the subscriber with an indication of the content of the received message, obtained by analyzing and processing the entirety of the body of the message.

Message Abstracting Apparatus

The message abstracting function can be accomplished in any of a number of ways, depending on the degree of relevance of the summary desired by the user and the amount of processing capability that must be extended to produce the summary. Assume for the purpose of this discussion that the message abstracting apparatus 110 includes a message analyzing system 107 that comprises a key word abstract system that operates on a text file to extract a plurality of key words or key word strings that are indicative of frequent usage in the text message and, therefore, most likely the content of the text message. The body of the text message is input into a temporary memory 105 which is used by the message abstracting system 110 to store input files while the message analyzing system 107 performs the information content analysis function. Once the text message is stored in the temporary memory 105, the message analyzing system 107 in well-known fashion retrieves sequentially each word in the text message and performs a word count function wherein a table created indicating the frequency of occurrence of the words contained in the text string, excluding standard prepositions and common words that contain little informational content. As a result of this abstracting function, a table has now been produced that indicates the most frequently used words or word strings in the text message. Additional data can also be generated by the message analyzing system 107 at step 208 to indicate the length of the message, its source and frequency of usage of the various key words that have been extracted. This summary content information is then stored at step 209 by the message analyzing system 107 in memory 105 or, alternatively, in the memory of the voice message storage system 101 along with the appropriate addressing information indicative of the association of this summary with the stored text message.

User Access of Stored Messages

When the subscriber accesses the multi-media message storage system 100 at step 210 to retrieve messages stored therein, the multi-media message storage system 100 at step 211 sequences through the stored messages that are addressed to the subscriber. At step 212 a determination is made to identify voice messages, which do not require special processing and which can be directly presented to the user. If the next retrieved message is a voice message, processing advances to step 216 where the multi-media message storage system 100 presents the entirety of the retrieved message to the subscriber in the conventional manner well known in voice message storage systems.

If, however, at step 212 it is determined that the retrieved message is not a voice message, processing advances to step 213, where the multi-media message storage system 100 retrieves the message summary and message characterizing data from the message abstracting system 110 that has been previously generated and is associated with this retrieved message. At step 214, the multi-media message storage system 100 provides the subscriber with an indication of the format of the retrieved message. Therefore, the subscriber, prior to retrieving a message, receives an indication of the form of the message, either text or voice in nature. For the text messages, the subscriber can activate the multi-media message storage system 100 at step 214 to initially provide the summary that is stored in conjunction with the text message and provide that to the subscriber in audible form. This enables the subscriber to obtain an indication of the content of the text messages and its duration to enable the subscriber to determine whether retrieval of the entirety of the text message in voice form is warranted.

If the subscriber wishes to receive the entirety of the retrieved message, this determination is made at step 215 and the multi-media message storage system 100 at step 216 presents the entirety of the retrieved message to the subscriber. Once the retrieved message has been presented to the subscriber at step 216, the multi-media message storage system 100 determines whether additional unretrieved messages remain in the multi-media message storage system 100. If so, processing returns to step 211, otherwise processing exits this routine at step 219.

While the present example illustrates the presentation of messages stored in the multi-media message storage system 100 seriatim in order of arrival, the multi-media message storage system 100 can, alternatively, group the stored messages according to mode. Thus, the subscriber can be provided with the voice mail messages, then the text messages, and the like.

SUMMARY

The multi-media message storage system provides an efficient mode of presenting non-voice messages to a subscriber by generating a content accurate summary of the body of the message as well as message characterizing data. When the user accesses the multi-media message storage system, the user is provided the opportunity to retrieve the summary and the message characterizing data to thereby determine the relevancy of the entirety of the text message. By the provision of this abstract information, the user can more efficiently scan through a series of messages to identify those that are of particular relevance and that warrant immediate attention.

What is claimed:

1. A multi-media message storage system for providing a user with efficient access to messages stored therein, comprising:

a memory for storing messages received by said multi-media message storage system in a mode native to said received message;

means, responsive to said received message, for extracting information from a body of said received message to produce a capsulization of the content of the received message that is indicative of a content of said message to enable the user to determine whether the stored message contains sufficient information that warrants the user playing back the entirety of the message; and means for storing said extracted data in a manner to enable presentation of said stored extracted data in a mode that differs from said native mode of said received message.

2. The multi-media message storage system of claim 1 wherein said native mode of said received message is text mode, said means for extracting comprises:

means for abstracting said received message to create said extracted data in said text mode.

3. The multi-media message storage system of claim 2 further comprising:

means, responsive to a user accessing said multi-media message storage system, for enabling said user to retrieve said stored extracted data in audible form.

4. The multi-media message storage system of claim 1, when consisting of a multi-media message storage system for the storage of messages of differing modes, further comprising:

means, responsive to a user accessing said multi-media message storage system, for enabling said user to retrieve said received message in its entirety in a mode that differs from a native mode of said received message.

5. The multi-media message storage system of claim 4 wherein said enabling means comprises:

means for converting said received message into a mode selected by said user; and means for outputting said received message to said user in said selected mode.

6. The multi-media message storage system of claim 4 wherein said enabling means comprises:

means for outputting said received message in audible form.

7. The multi-media message storage system of claim 1, when consisting of a multi-media message storage system for the storage of messages of differing modes, further comprising:

means for identifying a native mode of a received message; and means, responsive to a user accessing said multi-media message storage system, for presenting all messages received by said multi-media message storage system and addressed for said user in order or arrival of said message in said communication independent of said native mode of said received message.

8. A multi-media message storage system for providing a user with efficient access to messages stored therein, comprising:

a memory for storing messages received by said multi-media message storage system in a mode native to said received message;

means, responsive to said received message, for extracting information from a body of said received message that is indicative of a content of said message, comprising:

means for abstracting said received message to create said extracted data in said text mode, comprising:
      means for identifying frequency of word occurrence in said received message,
      means for storing a predetermined number of said words in order of frequency of occurrence; and means for storing said extracted data in a manner to enable presentation of said stored extracted data in a mode that differs from said native mode of said received message.

9. A multi-media message storage system for providing a user with efficient access to messages stored therein, comprising:

a memory for storing messages received by said multi-media message storage system in a mode native to said received message;

means, responsive to said received message, for extracting information from a body of said received message that is indicative of a content of said message, comprising:

means for abstracting said received message to create said extracted data in said text mode, comprising:
      means for computing a length of time required to play said received message in audible form,
      means for storing said computed time in with said excerpted information; and means for storing said extracted data in a manner to enable presentation of said stored extracted data in a mode that differs from said native mode of said received message.

10. A multi-media message storage system for providing a user with efficient access to messages stored therein, comprising:

a memory for storing messages received by said multi-media message storage system in a mode native to said received message;

means, responsive to said received message, for extracting information from a body of said received message that is indicative of a content of said message, comprising:

means for abstracting said received message to create said extracted data in said text mode, comprising:
      means for excerpting a header prepended to said received message,
      means for storing said excerpted header; and means for storing said extracted data in a manner to enable presentation of said stored extracted data in a mode that differs from said native mode of said received message.

11. A multi-media message storage system, consisting of a multi-media message storage system for the storage of messages of differing modes, for providing a user with efficient access to messages stored therein, comprising:

a memory for storing messages received by said multi-media message storage system in a mode native to said received message;

means, responsive to said received message, for extracting information from a body of said received message that is indicative of a content of said message;

means for storing said extracted data in a manner to enable presentation of said stored extracted data in a mode that differs from said native mode of said received message;

means for identifying a native mode of a received message; and means for disabling operation of said means for extracting in response to receipt of a voice mode message.

12. A multi-media message storage system, consisting of a multi-media message storage system for the storage of messages of differing modes, for providing a user with efficient access to messages stored therein, comprising:

a memory for storing messages received by said multi-media message storage system in a mode native to said received message;

means, responsive to said received message, for extracting information from a body of said received message that is indicative of a content of said message;

means for storing said extracted data in a manner to enable presentation of said stored extracted data in a mode that differs from said native mode of said received message;

means for identifying a native mode of a received message; and means, responsive to a user accessing said multi-media message storage system, for presenting all messages received by said multi-media message storage system and addressed for said user in order or arrival of said message in said communication as grouped by said native mode of said received message.

13. In a multi-media message storage system, a method of providing a user with efficient access to messages stored therein, comprising the steps of:

storing in a memory messages received by said multi-media message storage system in a mode native to said received message;

extracting, in response to said received message, information from a body of said received message to produce a capsulization of the content of the received message that is indicative of a content of said message to enable the user to determine whether the stored message contains sufficient information that warrants the user playing back the entirety of the message; and storing said extracted data in a manner to enable presentation of said stored extracted data in a mode that differs from said native mode of said received message.

14. The method of claim 13 wherein said native mode of said received message is text mode, said step of extracting comprises:

abstracting said recieved message to create said extracted data in said text mode.

15. The method of claim 14 further comprising the step of:

enabling, in response to a user accessing said multi-media message storage system, said user to retrieve said stored extracted data in audible form.

16. The method of claim 13, when implemented in a multi-media message storage system for the storage of messages of differing modes, further comprising the step of:

enabling, in response to a user accessing said multi-media message storage system, said user to retrieve said received message in its entirety in a mode that differs from a native mode of said received message.

17. The method of claim 16 wherein said step of enabling comprises:

converting said received message into a mode selected by said user; and outputting said received message to said user in said selected mode.

18. The method of claim 16 wherein said step of enabling comprises:

outputting said received message in audible form.

19. The method of claim 13, when implemented in a multi-media message storage system for the storage of messages of differing modes, further comprising the steps of:

identifying a native mode of a received message; and presenting, in response to a user accessing said multi-media message storage system, all messages received by said multi-media message storage system and addressed for said user in order or arrival of said message in said communication independent of said native mode of said received message.

20. In a multi-media message storage system, a method of providing a user with efficient access to messages stored therein, comprising the steps of:

storing in a memory messages received by said multi-media message storage system in a mode native to said received message;

extracting, in response to said received message, information from a body of said received message that is indicative of a content of said message, comprising:

abstracting said received message to create said extracted data in said text mode, comprising:

storing said extracted data in a manner to enable presentation of said stored extracted data in a mode that differs from said native mode of said received message, identifying frequency of word occurrence in said received message; and storing a predetermined number of said words in order of frequency of occurrence.

21. In a multi-media message storage system, a method of providing a user with efficient access to messages stored therein, comprising the steps of:

storing in a memory messages received by said multi-media message storage system in a mode native to said received message;

extracting, in response to said received message, information from a body of said received message that is indicative of a content of said message, comprising:

abstracting said received message to create said extracted data in said text mode, comprising:

computing a length of time required to play said received message in audible form, storing said computed time in with said excerpted information; and storing a predetermined number of said words in order of frequency of occurrence.

22. In a multi-media message storage system, a method of providing a user with efficient access to messages stored therein, comprising the steps of:

storing in a memory messages received by said multi-media message storage system in a mode native to said received message;

extracting, in response to said received message, information from a body of said received message that is indicative of a content of said message, comprising:

abstracting said received message to create said extracted data in said text mode, comprising:

excerpting a header prepended to said received message, storing said excerpted header; and storing a predetermined number of said words in order of frequency of occurrence.

23. In a multi-media message storage system for the storage of messages of differing modes, a method of providing a user with efficient access to messages stored therein, comprising the steps of:

storing in a memory messages received by said multi-media message storage system in a mode native to said received message;

extracting, in response to said received message, information from a body of said received message that is indicative of a content of said messages; and storing said extracted data in a manner to enable presentation of said stored extracted data in a mode that differs from said native mode of said received message;

identifying a native mode of a received message; and disabling operation of said means for extracting in response to receipt of a voice mode message.

24. In a multi-media message storage system for the storage of messages of differing modes, a method of providing a user with efficient access to messages stored therein, comprising the steps of:

storing in a memory messages received by said multi-media message storage system in a mode native to said received message;

extraction, in response to said received message, information from a body of said received message that is indicative of a content of said message;

storing said extracted data in a manner to enable presentation of said stored extracted data in a mode that differs from said native mode of said received message;

identifying a native mode of a received message; and presenting, in response to a user accessing said multi-media message storage system, all messages received by said multi-media message storage system and addressed for said user in order or arrival of said message in said communication as grouped by said native mode of said received message.

* * * * *